United States Patent
Ying et al.

(12)

(10) Patent No.: US 11,610,367 B2
(45) Date of Patent: Mar. 21, 2023

(54) THREE-DIMENSIONAL MODEL PROCESSING METHOD, ELECTRONIC DEVICE, AND STORAGE MEDIUM

(71) Applicant: Beijing Baidu Netcom Science Technology Co., LTD, Beijing (CN)

(72) Inventors: Qian Ying, Beijing (CN); Chen Zhao, Beijing (CN); Li Xu, Beijing (CN)

(73) Assignee: BEIJING BAIDU NETCOM SCIENCE TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 17/451,599

(22) Filed: Oct. 20, 2021

(65) Prior Publication Data
US 2022/0044476 A1    Feb. 10, 2022

(30) Foreign Application Priority Data
Nov. 23, 2020   (CN) .......................... 202011320645.5

(51) Int. Cl.
*G06T 17/10*     (2006.01)
*G06N 3/02*      (2006.01)
*G06T 15/08*     (2011.01)

(52) U.S. Cl.
CPC .............. *G06T 17/10* (2013.01); *G06N 3/02* (2013.01); *G06T 15/08* (2013.01)

(58) Field of Classification Search
None
See application file for complete search history.

(56) References Cited

U.S. PATENT DOCUMENTS

2020/0349758 A1* 11/2020 Paulson ................. G06T 15/04

FOREIGN PATENT DOCUMENTS

KR          20210084336      * 7/2021

OTHER PUBLICATIONS

KR 20210084336 English Translation (Year: 2021).*

* cited by examiner

*Primary Examiner* — Nurun Flora
(74) *Attorney, Agent, or Firm* — Morrison & Foerster LLP

(57) ABSTRACT

A three-dimensional model processing method, an electronic device, and a storage medium are provided, which are related to fields of deep learning, augmented reality, and the like. The specific implementation includes: generating a target virtual three-dimensional model based on a target model template; generating a target picture based on graphic and textual information and a preset network; and determining a superposition processing result of the target virtual three-dimensional model based on the target virtual three-dimensional model and the target picture.

17 Claims, 5 Drawing Sheets

THREE-DIMENSIONAL MODEL PROCESSING METHOD, ELECTRONIC DEVICE, AND STORAGE MEDIUM

CROSS-REFERENCE TO RELATED APPLICATIONS

This application claims priority to Chinese patent application, No. 202011320645.5, entitled "Three-Dimensional Model Processing Method and Apparatus, Electronic Device, and Storage Medium", filed with the Chinese Patent Office on Nov. 23, 2020, which is hereby incorporated by reference in its entirety.

TECHNICAL FIELD

The present disclosure relates to a technical field of computer technology, in particularly, to fields of deep learning and augmented reality.

BACKGROUND

The traditional packaging manners for products has been mostly fixed, from design, typesetting, printing to mass production, covering many production links and involving cooperation among a plurality of departments.

SUMMARY

According to the present disclosure, it is provided a three-dimensional model processing method and apparatus, an electronic device, and a storage medium.

According to a first aspect of the present disclosure, it is provided a three-dimensional model processing method, including:
  generating a target virtual three-dimensional model based on a target model template;
  generating a target picture based on graphic and textual information and a preset network; and
  determining a superposition processing result of the target virtual three-dimensional model based on the target virtual three-dimensional model and the target picture.

According to a second aspect of the present disclosure, it is provided a three-dimensional model processing apparatus, including:
  a model processing module for generating a target virtual three-dimensional model based on a target model template;
  a picture generation module for generating a target picture based on graphic and textual information and a preset network; and
  a synthesis module for determining a superposition processing result of the target virtual three-dimensional model based on the target virtual three-dimensional model and the target picture.

According to a third aspect of the present disclosure, it is provided an electronic device, including:
  at least one processor; and
  a memory communicatively connected to the at least one processor, wherein
  the memory stores instructions executable by the at least one processor, and the instructions are executed by the at least one processor to enable the at least one processor to perform the aforementioned method.

According to a fourth aspect of the present disclosure, a non-transitory computer-readable storage medium storing computer instructions is provided, wherein the computer instructions, when executed by a computer, cause the computer to perform the aforementioned method.

It should be understood that content in this section is not intended to identify key or critical features of embodiments of the present disclosure, nor is it intended to limit the scope of the present disclosure. Other features of the present disclosure will become readily apparent from the following description.

BRIEF DESCRIPTION OF THE DRAWINGS

The drawings are used to better understand the scheme and do not constitute a limitation to the present disclosure. In the drawings.

DETAILED DESCRIPTION

Exemplary embodiments of the present disclosure will be described below in combination with drawings, including various details of embodiments of the present disclosure to facilitate understanding, which should be considered as exemplary only. Therefore, those of ordinary skill in the art should realize that various changes and modifications can be made to the embodiments described herein without departing from the scope and spirit of the present disclosure. Likewise, descriptions of well-known functions and structures are omitted in the following description for clarity and conciseness.

Figure 1:
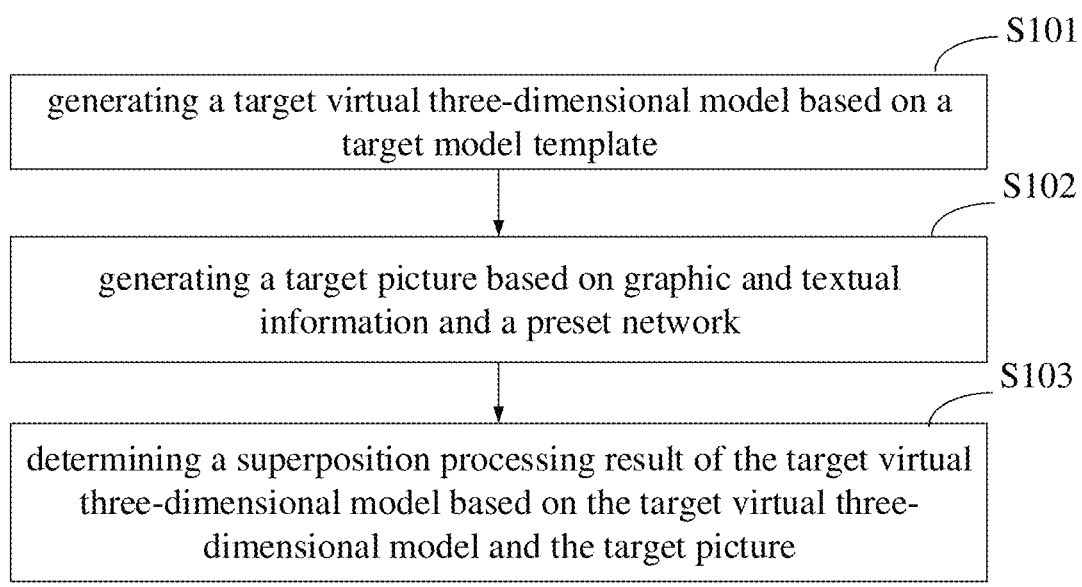
FIG. 1 is a schematic flowchart of a three-dimensional model processing method according to an embodiment of the present disclosure.

According to an embodiment of the present disclosure, as shown in FIG. 1, it is provided a three-dimensional model processing method, including:
  S101: generating a target virtual three-dimensional model based on a target model template;
  S102: generating a target picture based on graphic and textual information and a preset network; and
  S103: determining a superposition processing result of the target virtual three-dimensional model based on the target virtual three-dimensional model and the target picture.

The embodiment of the present disclosure can be applied to electronic devices, such as smartphones, tablet computers, notebook computers, and desktop computers. Further, a target application, which may be an application capable of performing the above steps S101 to S103, may be installed or run on the electronic device.

It should be noted that the above steps S101 and S102 may be performed in any order, it's allowable to perform S101 and then S102, or perform steps S101 and S102 simultaneously, or perform S102 and then S101.

The above target model template can be one selected from a plurality of candidate three-dimensional model templates.

Alternatively, the above target model template can be more than one selected from a plurality of candidate three-dimensional model templates.

The plurality of candidate three-dimensional model templates may be ones pre-stored in an electronic device. For example, the plurality of candidate three-dimensional model templates may be stored in a memory of the electronic device.

In a case of one target model template, generating the target virtual three-dimensional model based on the target model template may include: subjecting the target model template to parameter adjustment, and taking the adjusted target model template as the target virtual three-dimensional model. Alternatively, in a case of a plurality of target model templates, generating the target virtual three-dimensional model based on the target model templates may include subjecting the plurality of target model templates to weight adjustment, and combining the adjusted plurality of target model templates to obtain the target virtual three-dimensional model.

The step of generating the target picture based on the graphic and textual information and a preset network can be: inputting the graphic and textual information into the preset network to obtain the target picture output by the preset network.

Here, the graphic and textual information may include characteristic graphic information, textual information and the like. The characteristic graphic information can be specifically a logo picture. The textual information may include information related to a target object, such as a name of the target object, a formula of the target object, an origin of the target object. Here, the target object may be a product of the superposition processing result of the target virtual three-dimensional model to be generated this time.

The preset network may be a generative network, in particular, a generative adversarial network (GAN).

The step of determining the superposition processing result of the target virtual three-dimensional model based on the target virtual three-dimensional model and the target picture can be: subjecting the target virtual three-dimensional model and the target picture to three-dimensional rendering and material rendering, to obtain the superposition processing result of the target virtual three-dimensional model. In particular, the superposition processing result of the target virtual three-dimensional model is a three-dimensional presentation of the target virtual three-dimensional model.

Further, after the superposition processing result of the target virtual three-dimensional model is determined, the superposition processing result of the target virtual three-dimensional model can be previewed. The superposition processing result of the target virtual three-dimensional model is sent to a 3D printer in response to an instruction to print. Correspondingly, the 3D printer can print and output the superposition processing result of the target virtual three-dimensional model. Specifically, it is the three-dimensional presentation of the target virtual three-dimensional model that is sent to the 3D printer. Correspondingly, the 3D printer prints and outputs a three-dimensional presentation.

Therefore, by applying the above-mentioned scheme, a virtual three-dimensional model can be generated based on a target model template, a target picture can be generated based on a preset network and graphic and textual information, and finally a superposition processing result of the target virtual three-dimensional model can be obtained based on the target virtual three-dimensional model and the target picture. As such, each link in the process of generating a result of a three-dimensional model can be completed in an electronic device, until a superposition processing result of a target virtual three-dimensional model is finally obtained as a design result. In general, it's rare to frequently update product packaging designs, because the conventional packaging design process is complicated in the production process, which is long in cycles and inefficient, therefore, it's expensive to redesign and put into mass production. According to the scheme of the present disclosure, a series of processes of model proofing and then manually pasting the designed picture to the proofed model when combining the three-dimensional model and the target picture in the existing technologies can be eliminated, therefore, the problems of long design cycles, complex processes and the like are addressed, and the design costs can be reduced.

In the embodiment, before generating the target virtual three-dimensional model based on a target model template, the method further includes: determining a candidate three-dimensional model template corresponding to a target shape category, in response to selecting the target shape category; selecting the target model template from the candidate three-dimensional model template corresponding to the target shape category;

generating the target virtual three-dimensional model based on the target model template includes: performing a weight adjustment on the target model template, to obtain an adjusted target model template, and generating the target virtual three-dimensional model according to the adjusted target model template.

Such processing is particularly suitable for packaging design of more complex shapes, which can be characterized with Blendshape, and the system automatically recommends a product model.

That is, a user can select a target shape category to be used from preset shape categories. One or more candidate three-dimensional model templates corresponding to the target shape category are displayed to the user based on the target shape category.

Specifically, one or more candidate three-dimensional model templates can be stored in an electronic device, and one or more preset shape categories are also stored in the electronic device. Correspondingly, each preset shape category has a corresponding candidate three-dimensional model template stored in the electronic device. That is, different preset shape categories correspond to different one or more candidate three-dimensional model templates.

Here, the preset shape category can be set based on practical cases, for example, including beverage bottles, shampoos, and the like.

Selecting the target model template from the candidate three-dimensional model templates corresponding to the target shape category may include: selecting one or more target model templates from the one or more candidate three-dimensional model templates corresponding to the target shape category. For example, the target shape category corresponds to ten candidate three-dimensional model templates, from which a user can select three target model templates.

Further, two ways of processing are available after selecting one or more target model templates, wherein one is to directly combine a first or the plenty of target model templates to obtain the target virtual three-dimensional model. In this way, the method may specifically include: determining a relative position of each target model template in response to a handling operation of a user on each target model template in the one or more target model templates, and combining the one or more target model templates based on the relative position of each target model template.

For example, a user can select three of the ten candidate three-dimensional model templates as target model templates, which can be a target model template 1, a target model template 2, and a target model template 3, respectively. The relative position of the target model template 1 can be designated as an upper part, the relative position of the target model template 2 is a middle part, and the relative position of the target model template 3 is a lower part. Further, the target model templates 1, 2 and 3 are combined according to respective corresponding relative positions to obtain a combined target virtual three-dimensional model.

The other way of processing after selecting one or more target model templates may include: subjecting the one or more target model templates to weight adjustment to obtain adjusted one or more target model templates, and combining the adjusted one or more target model templates to obtain the target virtual three-dimensional model.

In this way, the weight adjustment of the one or more target model templates can specifically be: subjecting at least part of the one or more target model templates to the weight adjustment.

For example, a long bottleneck model template, a thin waist model template and a circular bottle bottom model template are included in a plurality of target model templates, and it is possible to adjust only the weight put to the long bottleneck model template. Specifically, if much more weight is put to the long bottleneck model template, a length of the long bottleneck model can be increased, hence the upper part of the final three-dimensional model template can be longer than the lower part. Many other adjustments are possible and this embodiment is not intended to be exhaustive.

The above adjusted target model templates are combined according to respective relative positions to obtain the target virtual three-dimensional model. Here, determining the relative position of each target model template may include: determining the relative position of each target model template in response to a handling operation of a user on each target model template in the one or more target model templates; and combining the one or more target model templates based on the relative position of each target model template.

By applying the above scheme, a candidate three-dimensional model template can be determined based on a target shape category, a target model template is then selected from candidate three-dimensional model templates, and the target model template is subjected to weight adjustment to generate a target virtual three-dimensional model. Therefore, a candidate three-dimensional model template can be provided for a user according to a target shape category required by the user, so that the target model template can be selected flexibly, the target model template can be adjusted by only resetting the weight, the difficulty in the design of the three-dimensional model can be reduced, and the efficiency of generating the three-dimensional model can be improved.

Generating the target picture based on the graphic and textual information and the preset network includes: formatting textual information in the graphic and textual information, to obtain formatted textual information; inputting identification graphic information in the graphic and textual information and the formatted textual information into the preset network, to obtain N pictures output by the preset network; and determining the target picture based on the N pictures, wherein N is an integer greater than or equal to 1.

Specifically, the textual information in graphic and textual information can include the name of a target object, the formula of the target object, a composition of the target object and the like. The target object may be a product. Acquiring the textual information in the graphic and textual information may include inputting, by the user, through an input interface of a target application in an electronic device, the textual information in the graphic and textual information.

The textual information in the graphic and textual information may be first formatted to obtain the formatted textual information. Specifically, the formatting may be based on a preset standard. The preset standard can be an international standard or a national standard and may include at least one text category, and positions corresponding to different text categories as well as fonts, type sizes and the like corresponding to different text categories.

The characteristic graphic information in the graphic and textual information may be a logo of the target object. Acquiring the characteristic graphic information may include selecting, by the user, through a target application in an electronic device, from preset characteristic images to obtain the characteristic graphic information. Alternatively, a user may directly input pre-designed characteristic graphic information into the electronic device as the characteristic graphic information. The characteristic graphic information may include the logo to be added to the target virtual three-dimensional model by the user.

It should be noted that apart from obtaining the above graphic and textual information, a target style may be acquired. That is, a user can set the target style of the design through the target application of the electronic device. Here, setting the target style may include selecting the target style for current use from one or more preset styles. For example, preset styles may be preset based on practical scenarios, including, for example, active, serious, and simple styles, etc.

The characteristic graphic information in graphic and textual information and the formatted textual information are input into the preset network to obtain N pictures output by the preset network, where N is an integer greater than or equal to 1. If N is greater than 1, the characteristic graphic information in the graphic and textual information and the formatted textual information are input into the preset network for N times, respectively, to obtain the picture output by the preset network each time, and finally N pictures are obtained. Alternatively, the characteristic graphic information in the graphic and textual information and the formatted textual information are input into the preset network for once to obtain N pictures output by the preset network.

It is to be noted that apart from the characteristic graphic information in graphic and textual information and the formatted textual information, other information may also be input into the preset network. Here, the other information may include the aforementioned target style, the characteristic graphic information in the graphic and textual information and the formatted textual information are input into the preset network to obtain N pictures output by the preset network, specifically:

inputting the characteristic graphic information in graphic and textual information, the formatted textual information, and the target style into the preset network to obtain N pictures output by the preset network.

The preset network can be a generative network, in particular, a generative adversarial network (GAN). The input to the preset network is the characteristic graphic information in the graphic and textual information and the formatted textual information, the output from the preset network is the N pictures. Alternatively, the input to the preset network is the characteristic graphic information in the graphic and textual information, the formatted textual information, and the target style, and the output is the N pictures. In addition, the preset network can be obtained through training based on a large number of given pictures, the given picture may be a picture of the packaging of a given product. Therefore, because the preset network is trained in conjunction with a large number of given pictures, picture learning can be realized with the preset network, so that a riper design style is provided for finally generating pictures with the preset network.

Determining the target picture based on the N pictures can be: selecting, by the user, one picture from the N pictures as the target picture according to experience, or selecting, by the user, one picture from the N pictures as the target picture according to requirements.

Therefore, the textual information in graphic and textual information can be formatted, and the formatted textual information and the characteristic graphic information in the graphic and textual information are input into the preset network to directly obtain one or more pictures output by the preset network, and finally the target picture is determined from the one or more pictures. Therefore, the tedious work of manually processing the textual information is eliminated, the picture may be obtained by directly taking the preset network to process the text and the characteristic graphic information input thereto, the efficiency of generating the target picture can be improved, and ultimately the efficiency of obtaining the superposition processing result of the target virtual three-dimensional model is improved.

Figure 2:
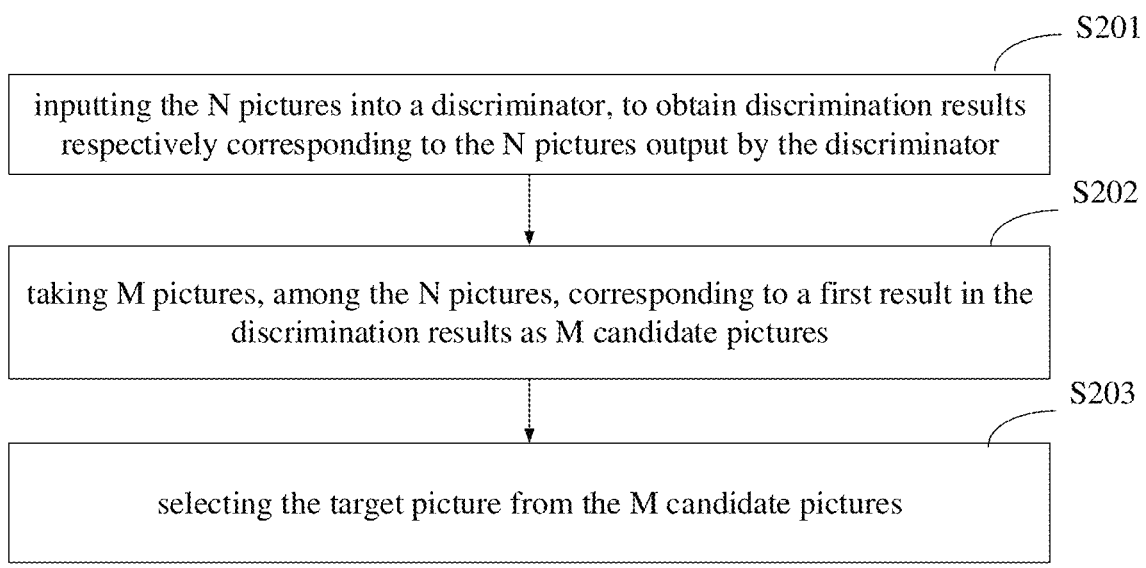
FIG. 2 is a schematic flowchart of a process for determining a target picture according to an embodiment of the present disclosure.

In the above processing, as shown in FIG. 2 determining the target picture based on the N pictures can specifically include:

S201: inputting the N pictures into a discriminator, to obtain discrimination results respectively corresponding to the N pictures output by the discriminator;

S202: taking M pictures, among the N pictures, corresponding to a first result in the discrimination results as M candidate pictures, wherein M is an integer greater than or equal to 1 and less than or equal to N; and S203: selecting the target picture from the M candidate pictures.

Inputting the N pictures into the discriminator to obtain discrimination results respectively corresponding to the N pictures output by the discriminator can specifically be:

inputting an i-th picture in the N pictures into the discriminator to obtain the discrimination result of the i-th picture output by the discriminator, where i is an integer greater than or equal to 1 and less than or equal to N.

Herein, the i-th picture may be any one of the N pictures, and all the pictures are processed the same, which will not be described in detail herein.

The discriminator may be one including preset discrimination conditions.

For example, the discrimination conditions in the discriminator may include at least one selected from the group of:

determining whether the i-th picture satisfies a requirement or a rule of the corresponding product category, if so, taking the discrimination result as a first result, otherwise, taking the discrimination result as a second result;

determining whether the i-th picture is the same as preset pictures of other products, if different, taking the discrimination result as the first result, otherwise, taking the discrimination result as the second result, wherein determining whether the i-th picture is the same as preset pictures of other products is intended to determine whether the i-th picture has a risk of infringement; and determining whether a position of the textual information and/or the characteristic graphic information in the i-th picture satisfies a preset position requirement, if so, taking the discrimination result as the first result, otherwise, taking the discrimination result as the second result.

The discrimination conditions corresponding to the above-mentioned discriminator can also be set based on practical scenarios, that is, not only can the above-mentioned discrimination conditions be included, but more or less of those can be included in actual processing, which will not be described in detail herein.

Herein, the discrimination results can include a first result and a second result, the first result can be true, and the second result can be false. Here, 0 and 1 may represent true or false discrimination results, for example, 1 may represent the first result, i.e., a true discrimination result, and 0 may represent the second result, i.e., a false discrimination result.

The discrimination results corresponding to the N pictures respectively can be obtained through the above-mentioned discriminator, and based on the discrimination results corresponding to the N pictures respectively, M pictures whose corresponding discrimination results are taken as the first result are selected from the N pictures as M candidate pictures. For example, the value of N is 10, that is, ten pictures are input into the discriminator, three of them have their discrimination results taken as a first result, i.e., a true discrimination result, and seven of them have their discrimination results taken as a second result, i.e., a false discrimination result, hence the three pictures whose discrimination results being the first result are taken as the candidate pictures.

Selecting the target picture from the M candidate pictures can be: selecting, by a user, any one from the M candidate pictures as the target picture.

In addition, pictures whose discrimination results being the second result in the N pictures can be directly deleted.

The above process of obtaining the target picture is exemplified as follows: a user firstly enters a target application, and inputs textual information, such as the product name, in an operator interface of the target application. Moreover, the user can select a target style (e.g., simple or luxurious style) in the operator interface, and can also select characteristic graphic information or add custom characteristic graphic information in the operator interface. The target application sends different textual information, characteristic graphic information and the like into different algorithm modules for processing. Specifically, the textual information is formatted according to standards such as national standards to generate formatted textual information, the textual information may include, for example, formulas, nutritional ingredients, and the like.

Figure 3:
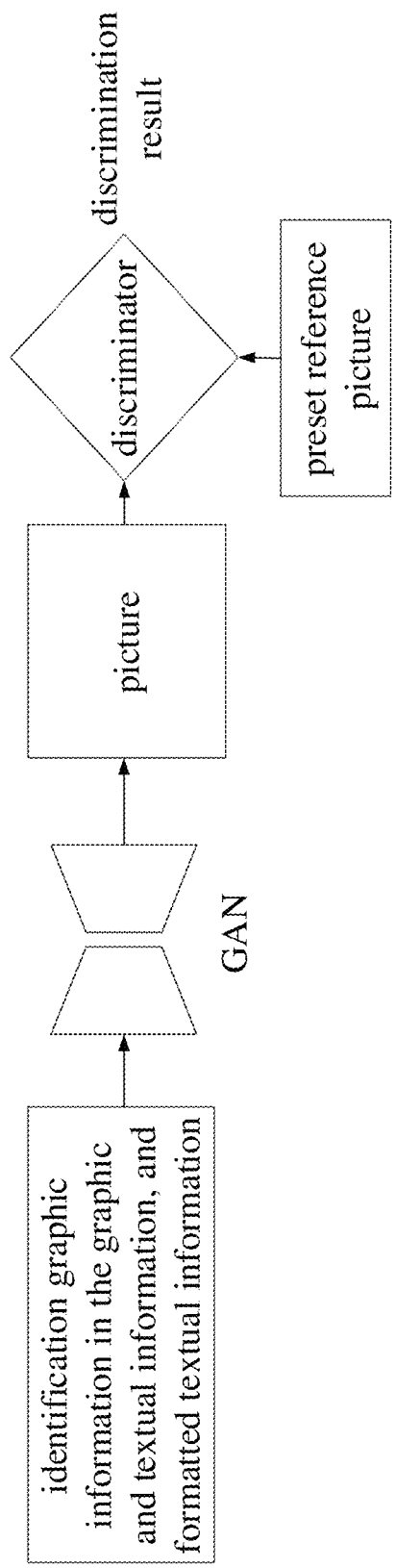
FIG. 3 is a schematic flowchart of a process for generating a picture and discriminating the picture according to an embodiment of the present disclosure.

The characteristic graphic information is input into the GAN to obtain a GAN generated picture. As shown in FIG. 3, the input into the GAN may include the characteristic graphic information and the formatted textual information. Other information may be included, and this embodiment is not intended to be exhaustive.

Referring again to FIG. 3, the picture generated by the GAN is input to the discriminator to obtain the discrimination result output by the discriminator. Herein, the picture generated by the GAN is subjected to the discriminator to obtain the discrimination result. Specific discrimination conditions of the discriminator and the like have been described in the foregoing embodiments and will not be described in detail herein. In addition, the discrimination results have also been described in the foregoing embodiments and will not be repeated herein.

As will be explained with reference to FIG. 3, the discriminator may be obtained by training based on preset reference pictures, which may be a number of existing packaging pictures designed by real designers. Training the discriminator based on the preset reference pictures may enable the discriminator to learn the requirements or rules that the packaging pictures corresponding to different types of products have to follow, and/or may train the discriminator to obtain a range of positions where texts and/or signs in the pictures are, etc., which will not be described in detail herein.

Therefore, by adopting the above scheme, N pictures generated by the preset network can be discriminated with the discriminator to obtain the discrimination result corresponding to each picture, M candidate pictures whose discrimination result taken as the first result are selected from the N pictures, and finally the target picture is determined from the M candidate pictures. Therefore, the pictures generated by the preset network can be preliminarily filtered through the discriminator, so that the target picture to be used is determined, the workload of manual selection from the preset network can be reduced, some of the pictures can be excluded more accurately and quickly by filtering the pictures generated by the preset network through the discriminator, and the efficiency of generating the superposition processing result of the target virtual three-dimensional model is finally improved.

It is to be noted that generating the target virtual three-dimensional model based on the target model template may otherwise include, specifically:

selecting the target model template from a candidate three-dimensional model template; and adjusting the target model template based on a model-related parameter, to obtain the target virtual three-dimensional model.

Such processing is particularly suitable for generating a target virtual three-dimensional model of a shape of simple geometry.

Here, the candidate three-dimensional model template can be one or more candidate three-dimensional model templates pre-stored in an electronic device. The number of candidate three-dimensional model templates pre-stored in an electronic device is not limited herein. For example, the candidate three-dimensional model templates may include cylindrical model templates, cubic model templates, spherical model templates, and the like.

The user can select one candidate three-dimensional model template from one or more preset candidate three-dimensional model templates as the target model template according to actual requirements.

Furthermore, the target application of the electronic device may also provide an operator interface, so that the user can set or adjust parameters through the operator interface. Target parameters related to the three-dimensional shape and size can be input through the operator interface. For example, the operator interface may provide boxes where parameters related to the three-dimensional shape and size such as radius and height, and the user can input required target parameters in the corresponding boxes.

The target model template is adjusted based on the target parameters related to the three-dimensional shape and size input by the user, where the adjusted target model template is the target virtual three-dimensional model.

Correspondingly, the target picture can be generated based on the graphic and textual information.

Specifically, the target virtual three-dimensional model is unfolded to obtain a net of a polyhedron thereof; based on the geometric corresponding relation between the target virtual three-dimensional model and the net of a polyhedron, the graphic and textual information is subjected to conversion to obtain converted graphic and textual information, and the converted graphic and textual information is added to the net of a polyhedron to obtain the target picture.

Herein, the graphic and textual information may include characteristic graphic information, textual information and the like. The characteristic graphic information can be specifically a logo picture, the textual information may include information related to a target object, such as a name of the target object, a formula of the target object, an origin of the target object, etc. Here, the target object may be a product of the superposition processing result of the target virtual three-dimensional model to be generated this time.

In addition, other picture information can also be included in the graphic and textual information, and the other picture information can be one or more picture information selected from at least one candidate picture material in a material library of the electronic device. Here, the material library maintained by the electronic device may be updated in real time based on practical scenarios.

Illustratively, if the target virtual three-dimensional model is a relatively simple geometric model, a net of a polyhedron of the target virtual three-dimensional model can be obtained directly by unfolding the target virtual three-dimensional model, wherein the net of a polyhedron can be obtained through UV unfolding. In the net of a polyhedron of the target virtual three-dimensional model, the user can drag a material from the material library provided by the electronic device (particularly, by the target application of the electronic device) as a target material, and the target material is converted and added into the net of a polyhedron of the target virtual three-dimensional model according to a geometric corresponding relation between the target virtual three-dimensional model and the net of a polyhedron from the perspective of the user. Moreover, the user can also input the graphic and textual information, and similarly, the graphic and textual information is converted and added to the net of a polyhedron of the target virtual three-dimensional model according to a geometric corresponding relation between the target virtual three-dimensional model and the net of a polyhedron from the perspective of the user. Finally, the target picture is obtained.

Therefore, processing for a model of a simpler geometric shape is provided, specifically including: selecting the target model template from the candidate three-dimensional model templates; and adjusting the target model template based on model-related parameters to obtain the target virtual three-dimensional model. As such, the target virtual three-dimensional model can be obtained by directly selecting the required target model template through simple adjustment of relevant parameters, the problems of complex processing flow and long cycles in design caused by drawing the three-dimensional model manually in the existing technologies can be eliminated, and the design efficiency is improved.

After a virtual three-dimensional model and a packaging pattern are generated as above, the virtual three-dimensional model and the packaging pattern can be combined, to finally obtain a three-dimensional packaging presentation. Specifically:

determining an initial rendering picture of the target virtual three-dimensional model based on the target virtual three-dimensional model and the target picture; and performing a material rendering on the initial rendering picture of the target virtual three-dimensional model based on a target material-related parameter, to obtain a rendering picture of the target virtual three-dimensional model.

Here, determining the initial rendering picture of the target virtual three-dimensional model based on the target virtual three-dimensional model and the target picture may be achieved through three-dimensional rendering, which may be based on a three-dimensional rendering engine. The three-dimensional rendering engine may be installed in a local electronic device, or may also be installed in a cloud server.

Furthermore, examples of the three-dimensional rendering engine may include, but are not limited to: a rasterized rendering engine based on Graphic APIs such as OpenGL, Metal, and Vulkan and a real-time or off-line rendering engine based on RayTracing.

The parameters related to the target material can be obtained by selecting material types (various preset materials such as plastic, metal, leather, paper, glass, plastic, and wood) to determine parameters related to the corresponding target material. That is, one or more candidate material types can be provided in the target application run by the electronic device, the user can select one of the one or more candidate material types as the target material, and correspondingly, the target material can correspond to default parameters related to the target material;

alternatively, parameters related to the target material are determined by looking up in a preset material parameter table, and the determined parameters related to the target material are input into the target application run by the electronic device.

The initial rendering picture of the target virtual three-dimensional model is subjected to material rendering based on the parameters related to the target material, specifically, the material rendering is conducted based on the parameters related to the target material by using a PBR (Physically Based Rendering) renderer (or otherwise called as a PBR coloring model or a PBR coloring network), to finally obtain the presentation of the target virtual three-dimensional model.

Furthermore, the initial rendering picture for the target virtual three-dimensional model can be further previewed in conjunction with illumination parameters, specifically including: previewing the presentation of the target virtual three-dimensional model based on the illumination parameters.

Here, the illumination parameters may be default illumination parameters or set illumination parameters.

Respectively, the default illumination parameters may be default illumination parameters of the target application in the electronic device, for example, the illumination parameters formed by an ambient illumination and a light source in at least one direction of the target application. For example, the default illumination parameters may be Image Based Illumination (IBL) owned by the target application (or system) of the electronic device and/or illumination parameters corresponding to a direct light source in at least one fixed orientation.

The set illumination parameters can be obtained by selecting a target illumination type from at least one candidate illumination type, and adjusting illumination parameters corresponding to the selected target illumination type. For example, a user selects a target illumination type among candidate illumination types provided by the target application (or system) of an electronic device to be added to a current operator interface (or may be added into illumination parameter settings of a current preview interface) and adjusts illumination parameters such as illumination intensity, color, and direction corresponding to the target illumination type.

Therefore, the target virtual three-dimensional model and the target picture can be subjected three-dimensional rendering and material rendering automatically, so that the effect of combining the currently designed target virtual three-dimensional model with the target picture can be presented to the user more visually, and the user can conveniently decide whether to finally adopt the current target virtual three-dimensional model and the target picture. Moreover, since the target virtual three-dimensional model and the target picture can be checked in real time during the design process, error rates can be reduced, time consumption caused by error tests can also be reduced if adjustment is needed, and design efficiency is improved.

Two ways of processing are available for determining the initial rendering picture of the target virtual three-dimensional model based on the target virtual three-dimensional model and the target picture, one of them is completed in a local electronic device, and the other is completed by a cloud server. Specifically, determining the initial rendering picture of the target virtual three-dimensional model based on the target virtual three-dimensional model and the target picture includes:

performing a three-dimensional rendering on the target virtual three-dimensional model and the target picture by using a local three-dimensional rendering engine, to obtain an initial rendering picture of the target virtual three-dimensional model;

or, uploading the target virtual three-dimensional model and the target picture to a server provided with a three-dimensional rendering engine, and acquiring an initial rendering picture of the target virtual three-dimensional model fed back by the server provided with the three-dimensional rendering engine.

Here, either in the case of the local electronic device or the cloud server, examples of the three-dimensional rendering engine may include, but are not limited to: a rasterized rendering engine based on Graphic APIs such as OpenGL, Metal, and Vulkan and a real-time or off-line rendering engine based on RayTracing.

In the processing completed by the cloud server, the target virtual three-dimensional model and the target picture can be sent to the cloud server provided with the three-dimensional rendering engine, and the cloud server provided with the three-dimensional rendering engine performs three-dimensional rendering with the three-dimensional rendering engine. The local electronic device can receive the initial presentation of the target virtual three-dimensional model after three-dimensional rendering fed back by the cloud server provided with the three-dimensional rendering engine. In the processing completed by the cloud server, the result obtained by the current processing can also be stored in real time.

It is to be noted that in the processing completed by the cloud server, the local electronic device can also display an operator interface of the processing at the cloud server, and the real-time processing of the cloud server can be seen on the operator interface; moreover, online editing is enabled through the operator interface, for example, to set related parameters or adjust a viewing angle, and the like, which will not be described in detail herein.

By adopting the above scheme, a three-dimensional rendering can be performed on a server side, so that processing resources of a local electronic device can be released, and because the computing and processing capacity of a server is significantly higher than that of a local electronic device, the processing efficiency can be improved. In addition, the three-dimensional rendering at a cloud server can reduce the cost in installing the software locally.

Figure 4:
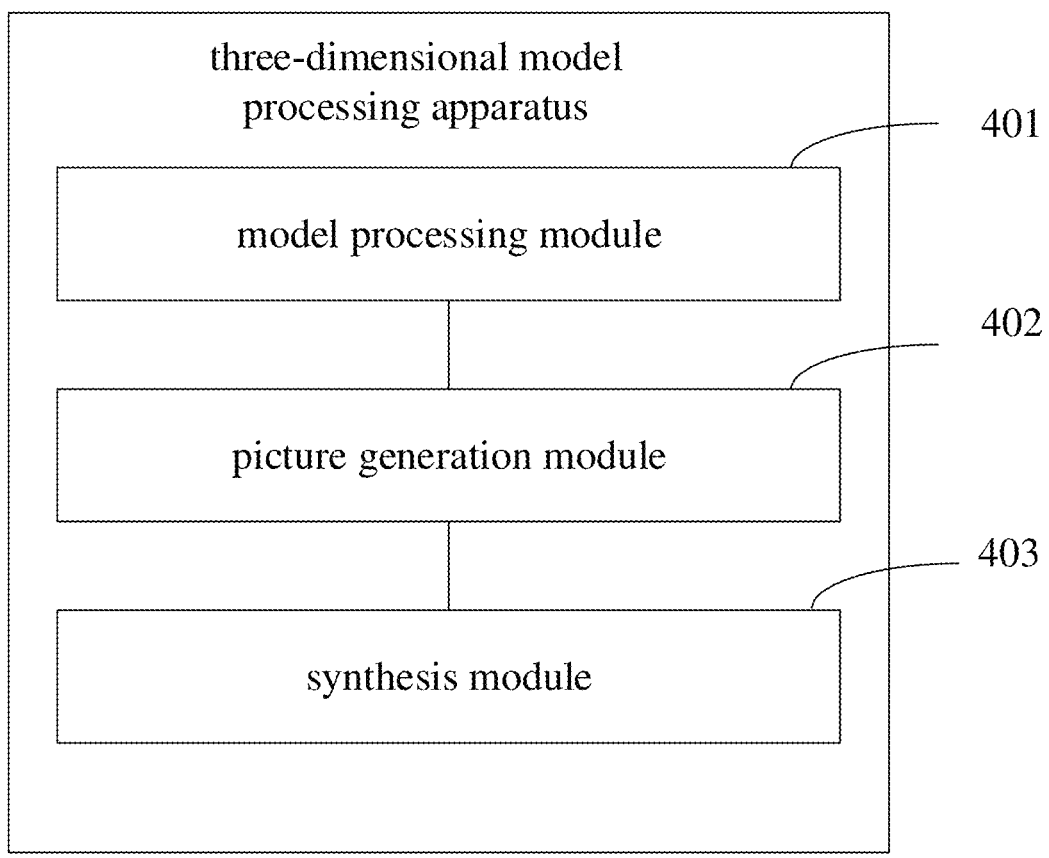
FIG. 4 is a schematic view showing components and a structure of a three-dimensional model processing apparatus according to an embodiment of the present disclosure.

According to an embodiment of the present disclosure, as shown in FIG. 4 the present disclosure further provides a three-dimensional model processing apparatus, including:

a model processing module 401 for generating a target virtual three-dimensional model based on a target model template;

a picture generation module 402 for generating a target picture based on graphic and textual information and a preset network; and a synthesis module 403 for determining a superposition processing result of the target virtual three-dimensional model based on the target virtual three-dimensional model and the target picture.

The model processing module 401 is configured for determining a candidate three-dimensional model template corresponding to a target shape category, in response to selecting the target shape category; selecting the target model template from the candidate three-dimensional model template corresponding to the target shape category; and performing a weight adjustment on the target model template, to obtain an adjusted target model template, and generating the target virtual three-dimensional model according to the adjusted target model template.

The picture generation module 402 is configured for formatting textual information in the graphic and textual information, to obtain formatted textual information; inputting identification graphic information in the graphic and textual information and the formatted textual information into the preset network, to obtain N pictures output by the preset network; and determining the target picture based on the N pictures, wherein N is an integer greater than or equal to 1.

The picture generating module 402 is configured for inputting the N pictures into a discriminator, to obtain discrimination results respectively corresponding to the N pictures output by the discriminator; taking M pictures, among the N pictures, corresponding to a first result in the discrimination results as M candidate pictures, wherein M is an integer greater than or equal to 1 and less than or equal to N; and selecting the target picture from the M candidate pictures.

The model processing module 401 is configured for selecting the target model template from a candidate three-dimensional model template; and adjusting the target model template based on a model-related parameter, to obtain the target virtual three-dimensional model.

The synthesis module 403 is configured for determining an initial rendering picture of the target virtual three-dimensional model based on the target virtual three-dimensional model and the target picture; and performing a material rendering on the initial rendering picture of the target virtual three-dimensional model based on a target material-related parameter, to obtain a rendering picture of the target virtual three-dimensional model.

The synthesis module 403 is configured for performing a three-dimensional rendering on the target virtual three-dimensional model and the target picture by using a local three-dimensional rendering engine, to obtain an initial rendering picture of the target virtual three-dimensional model;

or, uploading the target virtual three-dimensional model and the target picture to a server provided with a three-dimensional rendering engine, and acquiring an initial rendering picture of the target virtual three-dimensional model fed back by the server provided with the three-dimensional rendering engine.

According to an embodiment of the present disclosure, an electronic device, and a readable storage medium are provided in the present disclosure.

Figure 5:
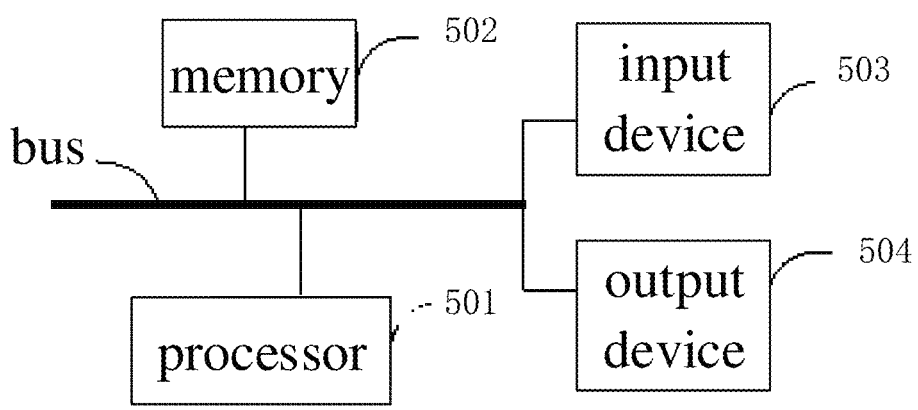
FIG. 5 is a block diagram of an electronic device for implementing a three-dimensional model processing method according to an embodiment of the present disclosure.

FIG. 5 is a block diagram of an electronic device for implementing a three-dimensional model processing method according to an embodiment of the present disclosure. The electronic device is intended to represent various forms of digital computers, such as laptop computers, desktop computers, workbenches, personal digital assistants, servers, blade servers, mainframe computers, and other suitable computers. Electronic apparatuses may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present disclosure described and/or claimed herein.

As shown in FIG. 5, the electronic device includes: one or more processors 501, memory 502, and interfaces for connecting components, including high-speed interfaces and low-speed interfaces. The various components are interconnected thorough different buses and may be mounted on a common motherboard or otherwise as desired. The processor may process instructions for execution within the electronic device, including instructions stored in or on a memory to display graphical information of a GUI on an external input/output device, such as a display device coupled to an interface. In other embodiments, multiple processors and/or multiple buses may be used with multiple memories, if desired. Likewise, connections may be made among multiple electronic devices, each providing some of the necessary operations (e.g., as an array of servers, a set of blade servers, or a multiprocessor system). An example of one processor 501 is shown in FIG. 5.

The memory 502 is a non-transitory computer-readable storage medium provided herein. Where the memory stores an instruction executable by at least one processor to cause the at least one processor to execute the three-dimensional model processing method provided herein. The non-transitory computer-readable storage medium of the present disclosure stores computer instructions for causing a computer to execute the three-dimensional model processing method provided herein.

The memory 502, as a non-transitory computer-readable storage medium, may be used to store non-transitory software programs, non-transitory computer-executable programs, and modules, for example, program instructions/modules corresponding to the method for three-dimensional model processing in the embodiments of the present disclosure (e.g., the model processing module, the picture generation module, and the synthesis module shown in FIG. 4). The processor 501 executes various functional applications of the server and data processing, i.e., implements the three-dimensional model processing method in the above-described method embodiment, by running non-transient software programs, instructions, and modules stored in the memory 502.

The memory 502 may include a storage program section and a storage data section, wherein the storage program section may store an operating system, an application program required for at least one function; the storage data section may store data and the like created according to use of the electronic device to implement the three-dimensional model processing method. In addition, the memory 502 may include a high speed random access memory, and may also include a non-transitory memory, such as at least one disk storage device, flash memory device, or other non-transitory solid state storage devices. In some embodiments, the memory 502 optionally includes memories remotely located with respect to processor 501, which may be connected to the electronic device to implement the three-dimensional model processing method via a network. Examples of such networks include, but are not limited to, the Internet, intranets, local area networks, mobile communication networks, and combinations thereof.

The electronic device for implementing three-dimensional model processing may further include: an input device 503 and an output device 504. The processor 501, the memory 502, the input device 503 and the output device 504 may be connected through a bus or other means, exemplified by a bus connection in FIG. 5.

The input device 503 may receive input numeric or character information and generate key signal inputs related to user settings and functional controls of the electronic device to implement the method for three-dimensional model processing, and examples of the input device 503 include touch screens, keypads, mice, track pads, touch pads, pointing sticks, one or more mouse buttons, track balls, joysticks, etc. The output device 504 may include display devices, auxiliary lighting apparatus (e.g., a Light Emitting Diode (LED)), a tactile feedback apparatus (e.g., a vibrating motor), etc. The display device may include, but is not limited to, a liquid crystal display (LCD), an LED display, and a plasma display. In some embodiments, the display device may be a touch screen.

Various embodiments of the systems and techniques described herein may be implemented in digital electronic circuit systems, integrated circuit systems, disclosure specific ASICs (disclosure specific integrated circuits), computer hardware, firmware, software, and/or combinations thereof. These various embodiments may be embodied in one or more computer programs, which can be executed and/or interpreted on a programmable system including at least one programmable processor, which can be a dedicated or general-purpose programmable processor, and can receive data and instructions from, and transmit data and instructions to, a memory system, at least one input device, and at least one output device, and the at least one output device.

These computing programs (also referred to as programs, software, software disclosures, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, equipment, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and techniques described herein may be implemented on a computer having: a display device (e.g., a CRT (cathode ray tube) or LCD (liquid crystal display) monitor) for displaying information to a user; and a keyboard and a pointing device (e.g., a mouse or a trackball) through which a user can provide input to the computer. Other types of devices may also be used to provide interaction with a user. For example, the feedback provided to the user may be any form of sensory feedback (e.g., visual feedback, auditory feedback, or tactile feedback); and input from the user may be received in any form, including acoustic input, voice input, or tactile input.

The systems and techniques described herein may be implemented in a computing system that includes a background component (e.g., as a data server), or a computing system that includes a middleware component (e.g., an disclosure server), or a computing system that includes a front-end component (e.g., a user computer having a graphical user interface or a web browser, wherein a user may interact with embodiments of the systems and techniques described herein through the graphical user interface or the web browser), or in a computing system that includes any combination of such background components, middleware components, or front-end components. The components of the system may be interconnected by any form or medium of digital data communication (e.g., a communication network). Examples of communication networks include: local Area Networks (LANs), Wide Area Networks (WANs), and the Internet.

A computer system may include a client and a server. The client and server are typically remote from each other and typically interact through a communication network. The relation of the client and the server is generated by computer programs running on respective computers and having a client-server relation with each other. The server can be a cloud server, also called a cloud computing server or a cloud host, is a host product in a cloud computing service system, and solves the defects of high management difficulty and weak business expansibility in the traditional physical host and virtual private server (VPS) service. The server can also be a server of a distributed system, or a server combined with a blockchain.

According to the technical scheme of embodiments herein, a target virtual three-dimensional model can be directly determined based on a target model template, a target picture is generated based on the model, and both of them are combined to obtain a final processing result. Therefore, a series of complex processes of model proofing and then manually pasting a designed picture on the proofed model in the existing technologies can be eliminated, and the problems of long design cycles, complex processes and the like are addressed, hence the efficiency is improved. Moreover, the processing provided by the present disclosure can be directly completed in an electronic device, and the problem of high costs caused by processes such as model proofing in the prior art is solved.

It should be understood that the various forms of flow, reordering, adding or removing steps shown above may be used. For example, the steps recited in the present disclosure may be performed in parallel or sequentially or may be performed in a different order, so long as the desired results of the technical solutions disclosed in the present disclosure can be achieved, and no limitation is made herein.

The above-mentioned embodiments are not to be construed as limiting the scope of the present disclosure. It will be apparent to those skilled in the art that various modifications, combinations, sub-combinations and substitutions are possible, depending on design requirements and other factors. Any modifications, equivalents, and improvements within the spirit and principles of this disclosure are intended to be included within the scope of this disclosure.

What is claimed is:

1. A three-dimensional model processing method, comprising:
    generating a target virtual three-dimensional model based on a target model template;
    generating a target picture based on graphic and textual information and a preset network; and
    determining a superposition processing result of the target virtual three-dimensional model based on the target virtual three-dimensional model and the target picture, wherein the method further comprises:
    determining a candidate three-dimensional model template corresponding to a target shape category, in response to selecting the target shape category; selecting the target model template from the candidate three-dimensional model template corresponding to the target shape category;
    wherein generating the target virtual three-dimensional model based on the target model template comprises: performing a weight adjustment on the target model template, to obtain an adjusted target model template, and generating the target virtual three-dimensional model according to the adjusted target model template.

2. The three-dimensional model processing method according to claim 1, wherein generating the target picture based on the graphic and textual information and the preset network comprises:
    formatting textual information in the graphic and textual information, to obtain formatted textual information; inputting identification graphic information in the graphic and textual information and the formatted textual information into the preset network, to obtain N pictures output by the preset network; and determining the target picture based on the N pictures, wherein N is an integer greater than or equal to 1.

3. The three-dimensional model processing method according to claim 2, wherein determining the target picture based on the N pictures comprises:
    inputting the N pictures into a discriminator, to obtain discrimination results respectively corresponding to the N pictures output by the discriminator;
    taking M pictures, among the N pictures, corresponding to a first result in the discrimination results as M candidate pictures, wherein M is an integer greater than or equal to 1 and less than or equal to N; and
    selecting the target picture from the M candidate pictures.

4. The three-dimensional model processing method according to claim 1, wherein generating the target virtual three-dimensional model based on the target model template comprises:
    selecting the target model template from a candidate three-dimensional model template;
    and adjusting the target model template based on a model-related parameter, to obtain the target virtual three-dimensional model.

5. The three-dimensional model processing method according to claim 1, wherein determining the superposition processing result of the target virtual three-dimensional model based on the target virtual three-dimensional model and the target picture comprises:
    determining an initial rendering picture of the target virtual three-dimensional model based on the target virtual three-dimensional model and the target picture; and
    performing a material rendering on the initial rendering picture of the target virtual three-dimensional model based on a target material-related parameter, to obtain a rendering picture of the target virtual three-dimensional model.

6. The three-dimensional model processing method according to claim 1, wherein determining the superposition processing result of the target virtual three-dimensional model based on the target virtual three-dimensional model and the target picture comprises:
    determining an initial rendering picture of the target virtual three-dimensional model based on the target virtual three-dimensional model and the target picture; and
    performing a material rendering on the initial rendering picture of the target virtual three-dimensional model based on a target material-related parameter, to obtain a rendering picture of the target virtual three-dimensional model.

7. The three-dimensional model processing method according to claim 2, wherein determining the superposition processing result of the target virtual three-dimensional model based on the target virtual three-dimensional model and the target picture comprises:
    determining an initial rendering picture of the target virtual three-dimensional model based on the target virtual three-dimensional model and the target picture; and
    performing a material rendering on the initial rendering picture of the target virtual three-dimensional model based on a target material-related parameter, to obtain a rendering picture of the target virtual three-dimensional model.

8. The three-dimensional model processing method according to claim 3, wherein determining the superposition processing result of the target virtual three-dimensional model based on the target virtual three-dimensional model and the target picture comprises:
    determining an initial rendering picture of the target virtual three-dimensional model based on the target virtual three-dimensional model and the target picture; and
    performing a material rendering on the initial rendering picture of the target virtual three-dimensional model based on a target material-related parameter, to obtain a rendering picture of the target virtual three-dimensional model.

9. The three-dimensional model processing method according to claim 4, wherein determining the superposition processing result of the target virtual three-dimensional model based on the target virtual three-dimensional model and the target picture comprises:
    determining an initial rendering picture of the target virtual three-dimensional model based on the target virtual three-dimensional model and the target picture; and
    performing a material rendering on the initial rendering picture of the target virtual three-dimensional model based on a target material-related parameter, to obtain a rendering picture of the target virtual three-dimensional model.

10. The three-dimensional model processing method according to claim 5, wherein determining the initial rendering picture of the target virtual three-dimensional model based on the target virtual three-dimensional model and the target picture comprises:

performing a three-dimensional rendering on the target virtual three-dimensional model and the target picture by using a local three-dimensional rendering engine, to obtain an initial rendering picture of the target virtual three-dimensional model;

or uploading the target virtual three-dimensional model and the target picture to a server provided with a three-dimensional rendering engine, and acquiring an initial rendering picture of the target virtual three-dimensional model fed back by the server provided with the three-dimensional rendering engine.

11. An electronic device, comprising:

at least one processor; and a memory communicatively connected to the at least one processor, wherein the memory stores instructions executable by the at least one processor, and the instructions are executed by the at least one processor to enable the at least one processor to:

generate a target virtual three-dimensional model based on a target model template;

generate a target picture based on graphic and textual information and a preset network; and determine a superposition processing result of the target virtual three-dimensional model based on the target virtual three-dimensional model and the target picture, wherein the instructions are executed by the at least one processor to further enable the at least one processor to:

determine a candidate three-dimensional model template corresponding to a target shape category, in response to selecting the target shape category; select the target model template from the candidate three-dimensional model template corresponding to the target shape category;

wherein generating the target virtual three-dimensional model based on the target model template comprises: performing a weight adjustment on the target model template, to obtain an adjusted target model template, and generating the target virtual three-dimensional model according to the adjusted target model template.

12. The electronic device according to claim 11, wherein the instructions are executed by the at least one processor to further enable the at least one processor to:

format textual information in the graphic and textual information, to obtain formatted textual information; input identification graphic information in the graphic and textual information and the formatted textual information into the preset network, to obtain N pictures output by the preset network; and determining the target picture based on the N pictures, wherein N is an integer greater than or equal to 1.

13. The electronic device according to claim 12, wherein the instructions are executed by the at least one processor to further enable the at least one processor to:

input the N pictures into a discriminator, to obtain discrimination results respectively corresponding to the N pictures output by the discriminator;

take M pictures, among the N pictures, corresponding to a first result in the discrimination results as M candidate pictures, wherein M is an integer greater than or equal to 1 and less than or equal to N; and select the target picture from the M candidate pictures.

14. The electronic device according to claim 11, wherein the instructions are executed by the at least one processor to further enable the at least one processor to:

select the target model template from a candidate three-dimensional model template; and adjust the target model template based on a model-related parameter, to obtain the target virtual three-dimensional model.

15. The electronic device according to claim 11, wherein the instructions are executed by the at least one processor to further enable the at least one processor to:

determine an initial rendering picture of the target virtual three-dimensional model based on the target virtual three-dimensional model and the target picture; and perform a material rendering on the initial rendering picture of the target virtual three-dimensional model based on a target material-related parameter, to obtain a rendering picture of the target virtual three-dimensional model.

16. The electronic device according to claim 15, wherein the instructions are executed by the at least one processor to further enable the at least one processor to:

perform a three-dimensional rendering on the target virtual three-dimensional model and the target picture by using a local three-dimensional rendering engine, to obtain an initial rendering picture of the target virtual three-dimensional model;

or upload the target virtual three-dimensional model and the target picture to a server provided with a three-dimensional rendering engine, and acquire an initial rendering picture of the target virtual three-dimensional model fed back by the server provided with the three-dimensional rendering engine.

17. A non-transitory computer-readable storage medium storing computer instructions, wherein the computer instructions, when executed by a computer, cause the computer to:

generate a target virtual three-dimensional model based on a target model template;

generate a target picture based on graphic and textual information and a preset network; and determine a superposition processing result of the target virtual three-dimensional model based on the target virtual three-dimensional model and the target picture, wherein the computer instructions, when executed by a computer, further cause the computer to:

determine a candidate three-dimensional model template corresponding to a target shape category, in response to selecting the target shape category; select the target model template from the candidate three-dimensional model template corresponding to the target shape category;

wherein generating the target virtual three-dimensional model based on the target model template comprises: performing a weight adjustment on the target model template, to obtain an adjusted target model template, and generating the target virtual three-dimensional model according to the adjusted target model template.

* * * * *